May 5, 1959  G. A. LYON  2,885,038
AIR CIRCULATING WHEEL STRUCTURE
Filed Jan. 14, 1954  3 Sheets-Sheet 2
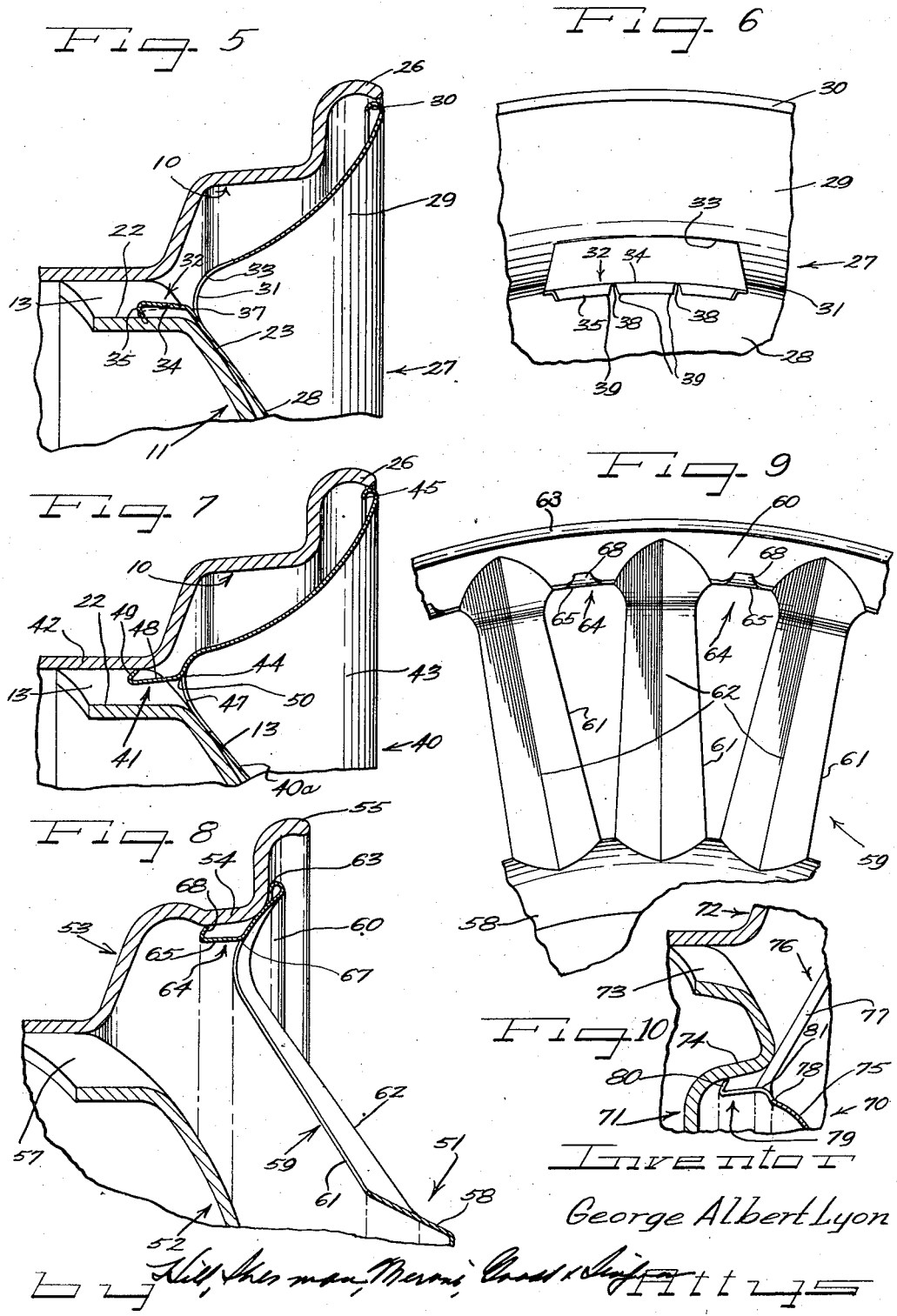

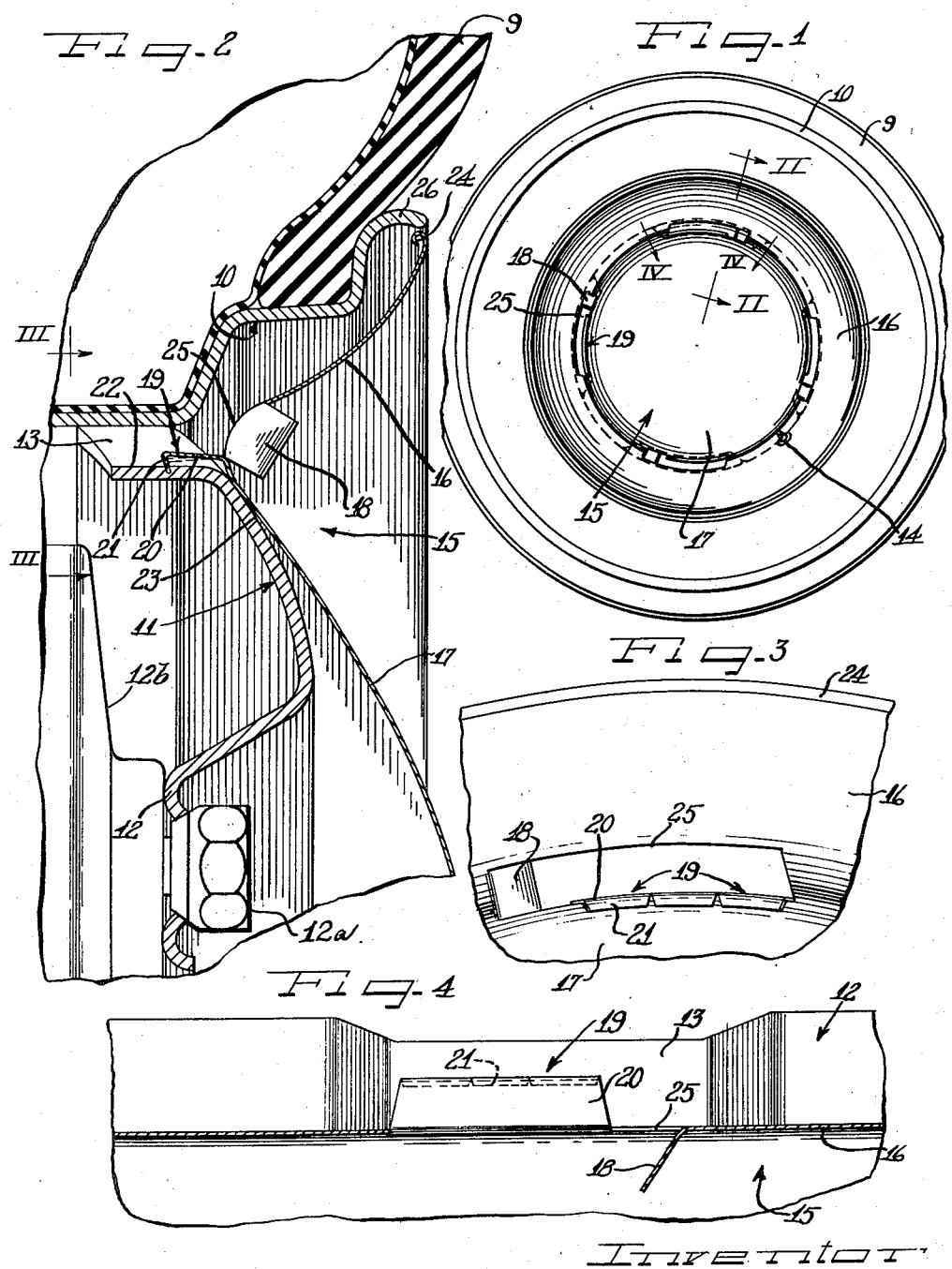

May 5, 1959  G. A. LYON  2,885,038
AIR CIRCULATING WHEEL STRUCTURE
Filed Jan. 14, 1954  3 Sheets-Sheet 3
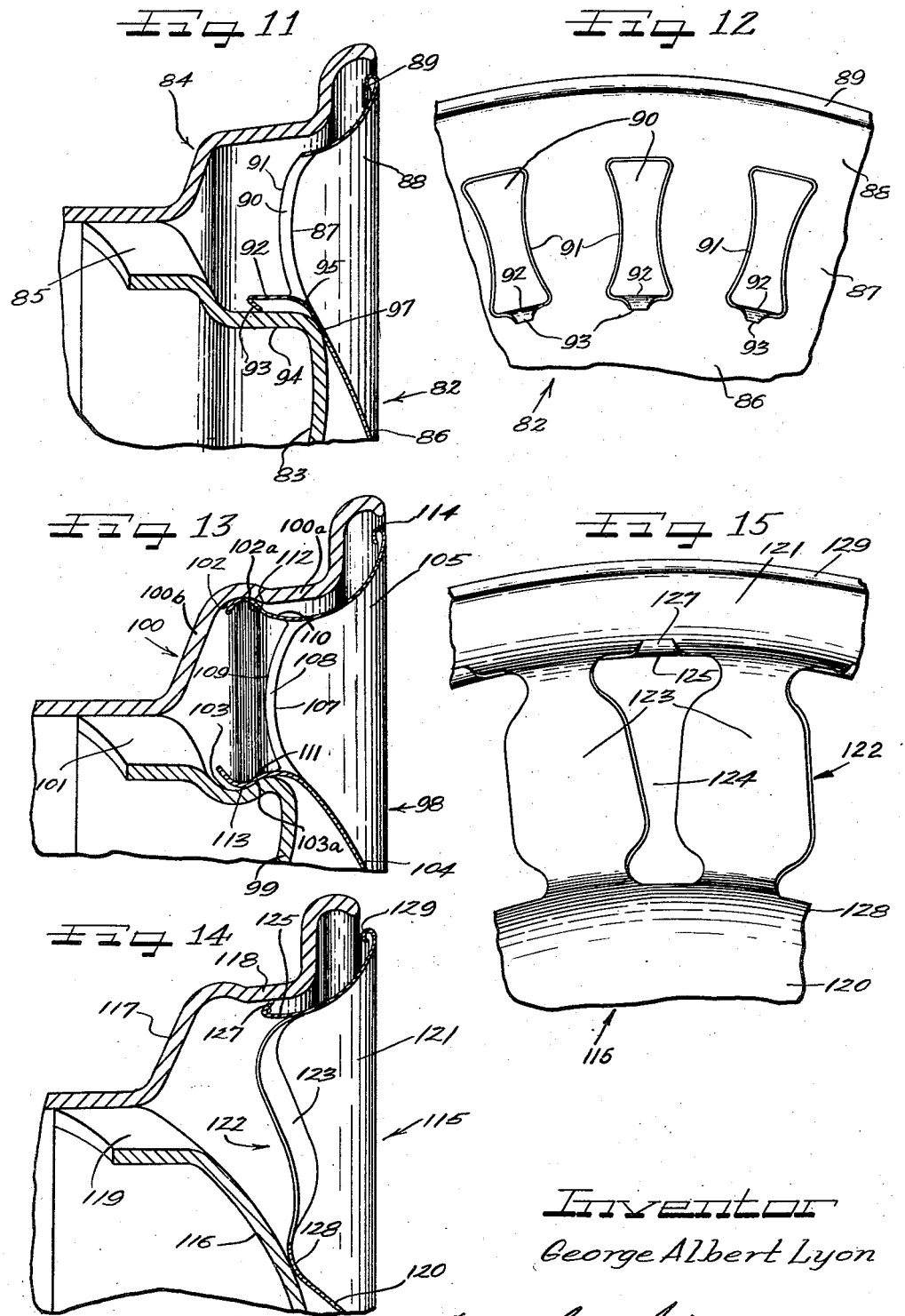
Inventor
George Albert Lyon

United States Patent Office 2,885,038
Patented May 5, 1959

2,885,038

AIR CIRCULATING WHEEL STRUCTURE

George Albert Lyon, Detroit, Mich.

Application January 14, 1954, Serial No. 404,021

16 Claims. (Cl. 188—264)

The present invention relates to improvements in wheel structures and more particularly concerns novel wheel structures providing for circulation of air therethrough as for brake cooling and is a continuation-in-part of my applications Serial No. 115,089, filed September 10, 1949, and Serial No. 247,477, filed September 20, 1951, both now abandoned.

Recent changes in automobile wheel brakes have necessitated a consideration of ways and means for augmenting the circulation of air through the wheel body around the brake. While various means such as fins and the like have been proposed for this purpose, it has been found that they materially add to the cost of the wheel assembly.

An object of this invention is to provide in the wheel cover itself vanes which will augment the circulation of air through the body of the wheel and which are so formed from the material of the cover as not to add to the material cost of the overall wheel assembly.

Another object of the invention is to provide an improved wheel structure having brake drum cooling air circulation openings therethrough and with a cover for the outer side of the wheel retained thereon in a manner which is in keeping with the desirability for effective air circulation through the wheel.

A further object of the invention is to provide an improved wheel cover for disposition at the outer side of a vehicle wheel and having novel retaining spring finger means enabling snap-on, pry-off application and removal of the cover.

Still another object of the invention is to provide in a vehicle wheel cover novel means for self-attachment of the cover to a vehicle wheel.

Yet another object is to provide in a wheel structure a cover arrangement which will substantially entirely cover the outer side of the wheel but is provided with openings through which dirt and gravel entering behind the cover through the wheel openings may escape.

Other objects, features and advantages of the present invention will be readily apparent from the following detailed description of certain preferred embodiments thereof, taken in connection with the accompanying drawings, in which:

Figure 1 is a fragmentary side view of a wheel structure having a wheel cover applied thereto embodying features of this invention;

Figure 2 is an enlarged fragmentary cross-sectional view taken on substantially the line II—II of Figure 1;

Figure 3 is a fragmentary rear view of a portion of the cover taken on substantially the line III—III of Figure 2;

Figure 4 is a fragmentary view partly in section taken on substantially the line IV—IV of Figure 1 and drawn to an enlarged scale;

Figure 5 is a fragmentary radial sectional view through a wheel structure showing a modification;

Figure 6 is a fragmentary rear elevational view of the cover of Figure 5;

Figure 7 is a fragmentary radial sectional view through a wheel structure showing another modification;

Figure 8 is a fragmentary radial sectional view through a wheel structure showing still another modification;

Figure 9 is a fragmentary rear elevational view of the cover of Figure 8;

Figure 10 is a fragmentary radial sectional view through a wheel structure showing yet another modification;

Figure 11 is a fragmentary radial sectional view through a wheel structure showing a still further modification;

Figure 12 is a fragmentary rear elevational view of the cover of Figure 11;

Figure 13 is a fragmentary radial sectional view through a wheel structure showing another modification;

Figure 14 is a fragmentary radial sectional view showing a yet further modification; and Figure 15 is a fragmentary rear elevational view of the cover of Figure 14.

Having reference to Figures 1 through 4, a wheel structure is shown wherein a conventional pneumatic tire and tube assembly 9 is mounted in the usual way upon a conventional multi-flange drop-center type of tire rim 10. The base of this tire rim 10 is secured at spaced intervals to a metallic wheel body or supporting member 11 which usually comprises a sheet metal stamping. This body member 11 has the usual central bolt-on flange 12 by means of which the wheel may be detachably secured as by means of cap screws or bolts (not shown) to a part of the vehicle.

As is well known in the automobile wheel art, the wheel body part or member 11 is usually provided with spaced wheel openings 13 at the junction of the body with the rim member or part 10, which openings alternate with the points of fastening between the wheel body and the rim and provide for the circulation of air through the interior of the wheel around the brake drum (not shown).

The tire and tube assembly 9 may have the usual valve stem 14 (Fig. 1) which can project in the usual way through a suitable hole in a wheel cover designated generally by the reference character 15.

My present invention is particularly concerned with the construction of the wheel cover 15 which may be made of any suitable material such, for example, as sheet metal. I have attained excellent results by stamping such covers from stainless steel sheet as such material lends itself to a high polish and finish. In addition, stainless steel possesses considerable resiliency which is admirably suited for use in retaining fingers on the wheel cover.

The cover 15 includes divergent radially outer and inner circular portions 16 and 17. The outer portion 16 is in the form of an annulus and the inner portion 17 is shown as being in the form of a disk, although it could be annular like the portion 16.

The junction of the two portions 16 and 17 is located directly opposite the wheel openings 13 and, in fact, telescopes into the wheel so that the same is positioned in close proximity to the wheel openings 13. This junction is provided with a plurality of punched out integral tangs formed into oppositely extending, generally axial vanes 18 and retaining fingers 19. A multiple set of these vanes and fingers is provided corresponding to the number of wheel openings 13. In punching each set of these vanes and fingers from the junction portion of the cover an opening 25 is provided which is located directly opposite the associated wheel opening 13 (Figs. 3 and 4). This arrangement is such that the vane 18 projects into the valley or depression of the divergent cover portions 16 and 17 for directing air during the forward movement of the vehicle through the opening 25 and through the wheel opening for cooling the brake (not shown) carried on the interior of the wheel.

It will, of course, be appreciated that right-hand and left-hand discs may be required since those used on one side of the vehicle may not be desirable on the other as the vanes 18 may not be properly positioned for use on either side of the vehicle. Actually, each vane is preferably so located, as shown in Figure 4, that movement of the vane to the left in the forward movement of the vehicle will result in air striking the vane 18 and being deflected into the opening 25.

Each of the fingers 19 includes a generally axially extending portion 20 terminating in a sharply bent angular notched out terminal portion 21 (Figure 3). This terminal portion 21 extends generally radially inwardly and is adapted to grippingly engage a wheel opening flange portion 22 of the wheel body member 11, defining the radially inner side of the wheel opening 13, for detachably holding the cover on the wheel.

In applying the cover 15 to the wheel the cover is first positioned to receive the valve stem 14 and then is pressed axially inwardly into the wheel until it bottoms at 23 (Fig. 2) on the body member 11 of the wheel. During the course of this movement the fingers 19 move into the wheel openings and their terminal portions 21 slide along the wheel opening flange portion 22 and tightly grip the same. By having the retaining fingers 19 of substantially narrower width than the width of the openings 13 (Fig. 4) rotary adjustment of the cover 15 for accurate registration of the valve stem aperture provided in the wheel cover (Fig. 1) with the valve stem 14 is permitted.

It will be observed that inasmuch as the juncture of the fingers 19 with the body of the cover is on a reinforcing rib that is of substantial length and curved with the perimeter of the wheel, such juncture will be substantially rigid. Moreover, the finger portions 20, being arcuately shaped, are of substantial resilient stiffness so that when the tips of the finger terminals 21 cam radially outwardly from the initial and smaller diameter than described by the outer faces of the wheel opening flange portions 22, as depicted in dash outline in Figure 2 to the full line position shown, substantial resilient tension is developed in the finger portion 20. As a result, the tips of the finger terminals 21 engage in firm retaining gripping relation against the wheel opening flange portions 22.

When the cover 15 is positioned on the wheel its outer turned edge 24 (Fig. 2) is inside of the terminal flange 26 of the wheel rim and is slightly spaced therefrom.

To remove the cover, the edge of a pry-off tool or tip portion of a screwdriver may be inserted under the turned edge 24 after which a slight turning or levering of the tool results in the forcible ejection of the cover from its retained cooperation with the wheel.

In the form of the invention shown in Figures 5 and 6, the construction is much the same as shown in Figures 2 and 3 with the exception that the air circulation vane has been omitted from association with the retaining fingers. In this modification a cover 27 is applied to the outer side of a wheel, the structure of which is the same as that shown in Figure 2 and therefore similar reference numerals have been applied to the wheel.

The cover 27 comprises a central or crown portion 28 and a circular radially outer marginal portion 29 which is preferably of generally outwardly convex structure and terminates in a turned annular reinforcing bead flange 30 disposed in assembly adjacent to but within the tip of the terminal flange 26 of the tire rim. The crown and marginal portions 28 and 29, respectively, are divergently connected by a fairly deeply dished annular axially inwardly directed rib and outwardly directed groove juncture formation 31 which substantially stiffens the wheel cover and in assembly is directed toward juncture of the wheel body member 11 with the tire rim 10 so that actually the juncture portion 31 overlies the wheel openings 13. It will be noted that the radially outer margin of the cover crown 28 lies against the wheel body as at 23 in assembly.

For retaining the cover 27 on the wheel, it is provided with a series of retaining fingers 32, preferably of the same number as the wheel openings 13 in the wheel. In an additional and effective construction, the retaining fingers 32 are provided integrally in one piece with the cover and are formed from material struck from the juncture portion 31 of the cover, providing air circulation openings 33 in the cover opposite the wheel openings 13. In this instance, substantially all of the material derived from striking the openings 33 may be used in providing the retaining fingers 32. To this end, the retaining fingers comprise substantial body flange portions 34 which have short and stiff generally radially inwardly and axially outwardly directed retaining terminals 35 thereon arranged to engage in firm retaining, gripping relation against the inset body flange portions 22.

At juncture with the cover body 28, the retaining fingers 32 have substantially rigid juncture ribs 37 formed preferably on an arc corresponding to the periphery of the cover and thereby backing the finger body portions 34 for substantial resilient tensioned engagement at the tips of the finger terminals 35 with the wheel body flanges 22 as the fingers are deflected from the dash outline position shown in Figure 5 to the full line position during press-on application of the cover to the wheel. It will be observed that the body portions of the fingers 34 are also arcuately formed corresponding to the arc of the juncture ribs 37 so that the fingers are provided with substantial resilient stiffness.

The retaining terminals 35 of the fingers 32 are notched, as shown at 38 in Figure 6, and accordingly each of the terminals 35 is actually divided into a plurality of individual retaining terminal portions which afford greater adaptability for the retaining terminals to any non-uniformities in the engaged flange and also provide a plurality of corners 39 which provide substantial anchorage on the wheel body flange 22 to resist turning of the cover relative to the wheel.

Referring to the modification in Figure 7, the same wheel is shown as in Figures 2 and 5 and therefore the same reference numerals are applied to the wheel. In this form, a wheel cover 40 is applied to the outer side of the wheel and comprises a structure substantially like that shown in Figures 5 and 6 except that a series of retaining fingers 41 on the cover engage against a base flange 42 of the tire rim 10 within the wheel openings 13. To this end, the cover 40 comprises a central crown portion 40a for substantially covering the wheel body 11 and an integral radially outer marginal portion 43 for substantially covering the tire rim 10, diverging from the crown portion 40a at a deeply dished annular juncture portion or rib 44 providing a generally axially outwardly opening annular groove opposite the juncture of the wheel body and the tire rim. At its outer margin, the portion 43 is provided with an underturned curled reinforcing bead 45 lying adjacent to the terminal flange tip 46.

The juncture portion 44 is provided with a series of openings 47 disposed opposite the wheel openings 13 and the material struck out from such openings provides the retaining fingers 41 which are provided with body portions 48 having short and stiff radially and axially outwardly directed retaining terminals 49 which engage in gripping retaining engagement with the radially inner face of the tire rim base flange 42 under substantial resilient tension, similarly as the retaining fingers 19 and 32, augmented by the substantial rigidity of the cover rib 44 from which the fingers extend and reinforcing very short radius reinforcing rib junctures 50 of the retaining finger bodies 48 with the cover.

It will be observed that in each of the forms of Figures 2, 5 and 7, the length of the retaining finger terminals is substantially less than the radial dimension of the wheel openings 13, that is, the space between the inset body flange portion 22 and base flange of the tire rim so that ample room for radial deflection of the retaining fingers is provided and the retaining fingers occupy only a small portion of the wheel opening so that air circulation through the wheel openings is substantially unimpeded.

Having reference, now, to the form of invention shown in Figures 8 and 9, a cover 51 is applied to the outer side of a wheel comprising a wheel body 52 carrying a tire rim 53 having an intermediate flange 54 that faces generally radially inwardly and joins a generally radially outwardly and axially outwardly extending terminal flange 55. At juncture of the wheel body 52 with the tire rim, a series of wheel openings 57 is provided through which air can circulate through the wheel.

The cover 51 comprises a circular central crown portion 58 having a generally radially outwardly and axially inwardly sloping side portion 59 joining a narrow circular annular outer marginal portion 60 which is adapted to overlie the tire rim. Herein, the cover portion 59, which in assembly lies opposite the juncture of the wheel body and the tire rim and thereby opposite the wheel openings 57, is provided with a uniform series of generally radially elongated openings 61 and intermediate radially elongated, ribbed spoke-like portions 62. Thereby, although the openings 61 in the wheel cover are of substantial length and width, the rigid spoke-like ribs 62 reinforce the cover and rigidify the same and actually provide a more rigid structure than if the cover were plain and imperforate.

Each of the ribs 62 merges at its radially inner end with the crown portion 58 in a manner to blend harmoniously therewith and to have rigid juncture with the crown. At their radially outer end portions, the spoke ribs 62 turn from the radially outwardly and axially inwardly directed relationship thereof into generally radially and axially outward relationship to merge in a rigid reinforced manner with the generally radially and axially outwardly directed annular marginal portion 60 of the cover. The latter portion of the cover is also substantially reinforced by an outer edge, under-turned reinforcing bead flange 63. In assembly, the marginal portion 60 of the cover is adapted to engage against the juncture shoulder between the intermediate and terminal flanges 54 and 55, respectively, of the tire rim, substantially as shown. Thereby, the openings 61 are disposed opposite the wheel openings 57 so that effective air circulation is provided for through the wheel and cover.

For retaining the cover 51 on the wheel, a series of retaining fingers 64 is provided. These fingers are preferably derived from material struck out in the formation of the cover openings 61, and more particularly material derived from the radially outer portions of the openings which, as seen in Figure 9, are preferably formed to be widest adjacent the outer margin of the cover and thereby generally opposite the wheel openings 57. Each of the retaining fingers 64 comprises a generally axially inwardly directed body portion 65 having juncture with the cover portion 60 on a reinforcing bend juncture rib 67 and having a generally radially and axially outwardly directed short and stiff retaining terminal 68 adapted to engage in firm retaining and gripping relation with the inner face of the intermediate flange 54 of the tire rim. It will be observed that the retaining fingers 64 are of tapering formation having their widest dimension at the juncture 67 and their narrowest dimension at the terminals 68. The relationship to the intermediate flange 54 of the retaining terminals 68 is such that normally the tips of the terminals extend to a larger diameter than the inside diameter of the terminal flange 54 so that as the cover is pressed onto the wheel, the body portions 65 on the fingers are flexed radially inwardly and are thus substantially resiliently tensioned so that the retaining terminals will grip the rim flange quite firmly. It will be observed that although in the form of Figures 8 and 9 the retaining fingers 64 are substantially narrower than the retaining fingers of the previously described forms of the invention, there are a greatly increased number of the retaining fingers 64 so that in the aggregate they effect a thorough retaining engagement which under at least some service conditions may be even better than the retaining engagement effected by the previously described retaining fingers.

In Figure 10 is shown a modification wherein a cover 70 is applied to the outer side of a wheel including a wheel body 71 and a tire rim 72 having at juncture thereof wheel openings 73. The wheel body 71 is provided with an intermediate generally axially extending and radially inwardly facing annular flange 74. The cover 70 is provided with an inner crown portion 75 that joins in divergent relation with a generally radially and axially outwardly directed outer cover portion 76 provided with a series of generally radially extending openings 77 which are disposed opposite juncture of the wheel body and tire rim and thus opposite the wheel openings 73 for air circulation purposes.

Juncture of the crown portion 75 and the outer portion 76 of the cover is on a generally axially inwardly directed annular reinforcing rib 78. For retaining the cover on the wheel, material struck from the openings 77 and integrally joining the crown 75 at the radially inner ends of the openings is formed into a series of retaining fingers 79 which extend generally axially inwardly on a diameter somewhat less than the inside diameter of the wheel body flange 74 so that generally radially and axially outwardly directed terminals 80 on the inner ends of the fingers 79 will engage in retaining and gripping relation against the flange 74 to retain the cover on the wheel. It will be observed that at juncture with the cover body, the fingers 79 have a stiff reinforcing rib juncture 81 so that the fingers are backed up by the rigid juncture to enter into firm resiliently tensioned gripping engagement with the wheel flange 74.

Upon reference to Figures 11 and 12, it will be observed that a cover 82 is applied to the outer side of a wheel comprising a wheel body 83 and a tire rim 84, wheel openings 85 being provided at juncture of the wheel body with the tire rim. The cover 82 comprises a central cover portion 86 joining on a convex-concave annular rib-like generally axially inwardly directed juncture 87 with a radially outer annular marginal cover portion 88 which terminates in an underturned reinforcing and finishing bead 89 which in assembly is disposed in spaced relation to the terminal flange of the tire rim. The intermediate juncture portion 87 of the cover is arranged to lie in assembly with the wheel opposite the juncture between the wheel body and the tire rim and thus opposite the wheel openings 85 and is provided with a series of annularly disposed spaced openings 90 which are preferably defined by continuous generally axially directed respective reinforcing flanges 91, the radially inner portions of which are extended generally axially inwardly to provide retaining fingers 92 having short and stiff generally radially inwardly and axially outwardly directed terminals 93 engageable in retaining gripping relation with the radially outwardly facing surface of a generally axially extending flange 94 of the wheel body. It will be appreciated that the retaining terminals 93 normally extend to a diameter smaller than the diameter of the outer face of the flange 94 so that as the cover is pressed inwardly onto the wheel the fingers 92 will be flexed generally radially outwardly and thus substantially tensioned, as backed up by the flange 91 and a juncture rib 95 where the fingers 92 join the wheel cover body 86. In the final assembly, the wheel cover engages against the wheel body at 97. Thereby, the radially outer portion 88 of the cover is held in spaced relation to the tire rim which it substantially covers and therefore, in addition to escape permitted for dirt through the openings 90, as well as air circulation, a gap between the cover and the tire rim is afforded for air circulation and escape of dirt or gravel.

In the modification of Figure 13, a cover 98 is shown as applied to the outer side of a wheel including a wheel body 99 and a tire rim 100, with wheel openings 101 between the wheel body and the tire rim. The tire rim in this instance is provided with an annular groove 102 facing radially inwardly at juncture of intermediate flange 100a and side flange 100b of the tire rim while the wheel body 99 is provided with a generally axially extending portion that is provided with an annular groove 103 that faces generally radially outwardly toward the groove 102.

The cover 98 comprises a central portion 104 and a radially outer annular marginal portion 105 adapted to overlie the tire rim and the two portions of the cover are joined by an inwardly convex and an outwardly concave annular juncture portion 107 provided with a series of openings 108 disposed opposite the juncture of the tire rim and the wheel body and thus opposite the wheel openings 101. The openings 108 are provided with respective reinforcing flanges 109 thereabout derived from the material struck from the openings and extending axially inwardly.

For retaining the cover 98 on the wheel, retaining spring fingers 110 and 111 are provided at respectively the radially outer and radially inner ends of the openings 108 and derived from the material struck from the openings and constructed as integral extensions in one piece from the radially outer and radially inner portions of the reinforcing flange 108, respectively. The retaining spring fingers 110 are provided with generally radially outwardly directed engagement terminal loop portions 112 retainingly engageable in the groove 102 behind a shoulder 102a thereof at the axially outer side of the groove. The retaining fingers 111 are provided with radially inwardly directed retaining loop portions 113 engageable retainingly in the groove 103 behind an axially outer shoulder 103a defining the same. It will be appreciated, of course, that the retaining tabs or loop terminal portions 112 of the fingers 110 extend normally to a greater diameter than the inside diameter defined by the groove 102 while the retaining finger engagement terminal loop portions 113 normally extend to a smaller diameter than the diameter defined by the groove 103 so that when the cover is pressed axially inwardly the retaining finger loops will cam against respectively the tire rim intermediate flange and the shoulder 103a of the wheel body and snap retainingly into the respective grooves, thereby retaining the cover in place on the wheel.

It will be observed that the outer marginal portion 105 of the cover 98 is provided with an underturned edge reinforcing bead 114 which in assembly with the wheel lies in spaced relation to the terminal flange of the tire rim. In fact, the entire outer marginal portion 105 of the cover is arranged to be in spaced relation to the tire rim so that not only may air circulate through the openings 108, but also through the gap between the cover portion 105 and the tire rim. In addition, dirt can escape from behind the cover through the wheel openings 108 and through the gap between the tire rim and the cover.

A cover 115 is shown in Figures 14 and 15 adapted to be applied to the outer side of a wheel comprising a wheel body 116 and a tire rim 117 having an intermediate flange 118. Wheel openings 119 are provided between the wheel body and the tire for air circulation.

The cover 115 has a crown portion 120 adapted to lie opposite the wheel body 116 and an annular outer portion 121 adapted to lie opposite the tire rim. Between the crown portion 120 and the outer annular marginal portion 121 is an intermediate portion 122 which is provided with generally spoke-like twisted louvre generally radially extending portions 123 which join the crown and outer annular portions in a manner to provide substantial radial rigidity but to permit a certain amount of relative axial flexing of the crown and outer annular portions. In the formation of the louvre portions 123, the intermediate portion 122 is formed with a series of generally dumbbell shaped radially elongated openings 124, and the intermediate portion is of generally ogee shape in cross section substantially as seen in Figure 14. Then, by generally annularly relatively turning or skewing the crown portion 120 and the outer annular portion 121, the portions of the cover between the openings 124 are tilted, as shown, relative to one another and relative to the remaining cover portions to provide the air circulation promoting vanes or louvres 123. It will be observed that the openings 124 and the louvres 123 are disposed opposite the wheel openings 119.

For retaining the cover 115 on the wheel, material derived from the openings 124 at the radially outer ends of the openings is directed axially inwardly to provide retaining fingers 125 having short and stiff generally radially and axially outwardly directed terminals 127 which in assembly with the wheel engage in firm retaining, gripping relation with the inner face of the intermediate flange 118 of the tire rim. It will be observed that the marginal portion 121 on the cover is of concave-convex form and thus of rigid structure and thereby rigidly backs up the relatively short, tapering retaining fingers 125 so that the latter are provided with substantial resilient resistance to radially inward deflection as the cover is pressed inwardly on the wheel and the retaining fingers are deflected radially inwardly by camming of the retaining terminals 127 along the inner face of the flange 118 of the tire rim. When assembly of the wheel has been completed, the cover engages at 128 against the wheel body radially inwardly from the wheel openings 119, and the outer cover portion 121 is preferably disposed in spaced relation to the tire rim. An underturned marginal reinforcing and finishing bead 129 on the cover portion 121 lies in spaced relation to the terminal flange of the tire rim. It will be appreciated that air may circulate freely through the openings 124 and through the gap between the outer cover portion 121 and the tire rim, as promoted by the tilted louvres or vanes 123. In addition, dirt may easily escape from behind the cover through the cover openings 124 and the gap between the cover and the tire rim.

In all forms of the cover, removal of the cover can be easily effected by applying a pry-off tool behind the outer reinforced edge of the outer portion of the cover.

In all forms of the cover, it has been noted that the cover retaining fingers emanate from and are assisted in their cover-retaining function by a rigid portion at juncture of the fingers with the respective covers.

It will be understood that variations and modifications may be effected without departing from the scope of the novel concepts of this invention.

I claim as my invention:

1. In a vehicle wheel assembly including a multi-flanged tire rim and a wheel body connected to the rim and having wheel openings, a circular cover member disposed on the wheel over the junction of said rim and body member and including portions diverging from the area of said wheel openings, and a plurality of air vanes and cover retaining finger means projecting generally axially in opposite directions from the junction of said portions, each set of vanes and finger means being formed from a portion of the cover cut from and providing an opening at said junction behind the vanes.

2. In a vehicle wheel assembly including a multi-flanged tire rim and a wheel body connected to the rim and having wheel openings, a circular cover member disposed on the wheel over the junction of said rim and body member and including portions diverging from the area of said wheel openings, and a plurality of air vanes and cover retaining finger means projecting generally axially in opposite directions from the junction of said portions, each set of vanes and finger means being formed from a portion of the cover cut from and providing an opening at said junction behind the vanes, said vanes projecting axially outwardly between the diverging portions of the cover member.

3. As an article of manufacture a circular wheel cover with radially inner and outer divergent circular portions and tank-like means pressed from the junction of said portions leaving air-circulating openings therein and formed into oppositely projecting air-circulating vanes and cover-retaining fingers.

4. As an article of manufacture, a circular wheel cover including a generally annular junction portion having peripherally spaced openings therethrough, and means formed from the junction portion comprising axially outwardly projecting vanes formed integrally with the material adjacent said openings, and axially inwardly projecting cover retaining means formed integrally with the material adjacent said openings.

5. As an article of manufacture, a circular wheel cover with radially inner and outer divergent circular portions and a junction portion therebetween, and tang-like means pressed from the junction portion leaving air-circulating openings therein, said tang-like means being formed into cover retaining fingers extending generally axially inwardly from the margins of said openings and air-circulating vanes extending generally axially outwardly from the margins of said openings and providing air deflecting faces.

6. In a wheel structure including a tire rim and a wheel body of the disk spider type having openings therethrough defined at one radial side thereof by an axially inwardly extending reinforcing flange portion, a sheet metal cover for the outer side of the wheel having a marginal portion substantially covering the outer side of the tire rim and provided substantially radially inwardly relative to the marginal portion with axially rearwardly extending resilient retaining fingers including elongated resiliently radially deflectable body portions and short and stiff divergently extending gripping terminals engageable in edgewise gripping, snap-on, pry-off relation with the opposing axially extending surface of said wheel opening reinforcing flange portions, said terminals being substantially shorter than the radial depth of said wheel openings, the body portions of the fingers being deflected radially and placed under resilient tension for driving the tips of said retaining terminals against said flange portions, the wheel cover marginal portion having a valve stem aperture therein, and the retaining fingers being substantially narrower than the wheel openings to permit rotary adjustment of the cover for accurate registration of the valve stem aperture with a valve stem.

7. A cover for disposition at the outer side of a vehicle wheel having a tire rim and a wheel body provided with openings defined by flange portions at one side thereof, the cover comprising a body portion having generally axially rearwardly extending cover retaining fingers spaced radially inwardly from the outer edge of the cover and having axially elongated and transversely arcuate resiliently radially deflectable body portions and short and stiff divergent acutely angular retaining terminal flanges engageable with said opening flange portions, said short and stiff terminal flanges being substantially shorter than the normal radial depth of a wheel opening, the body portions of the fingers being several times longer than the retaining terminal flanges and having tapering sides whereby the portions of the fingers adjacent juncture with the body of the cover are wider than the portions thereof adjacent to the retaining terminal flanges, the radially outer margin of the cover body being reinforced and being engageable without damage by a pry-off tool.

8. In a cover for disposition at the outer side of a vehicle wheel including a tire rim and a wheel body and wherein the wheel body has wheel openings at the tire rim, the cover comprising a body including a crown portion and a trim ring portion divergently related and joined integrally on a generally axially inwardly extending annular juncture rib, a plurality of cover retaining fingers struck from said rib affording ventilation openings generally corresponding to the wheel openings, the fingers extending axially inwardly from said openings and being of tapering body formation and transversely arcuate form and having short and stiff retaining finger terminal flanges divergent therefrom for engagement with a wall of the wheel defining the wheel opening with which the finger is disposed in the assembled condition of the cover on the wheel.

9. In a cover for disposition at the outer side of a vehicle wheel including a tire rim and a wheel body and wherein the wheel body has wheel openings at the tire rim, the cover comprising a body including a crown portion and a trim ring portion divergently related and joined integrally on a generally axially inwardly extending annular juncture rib, a plurality of cover retaining fingers struck from said rib affording ventilation openings generally corresponding to the wheel openings, said fingers extending axially inwardly from said openings and being of tapering body formation and transversely arcuate form and having short and stiff retaining finger terminal flanges divergent therefrom for engagement with a wall of the wheel defining the wheel opening with which the finger is disposed in the assembled condition of the cover on the wheel, the finger terminal flange of each finger being subdivided into a plurality of individual sections.

10. In a wheel structure including a tire rim and a wheel body, the wheel having air circulation openings therethrough defined by a generally axially extending wall portion, a cover disposed in a substantially concealing relation to the wheel openings and having generally axially inwardly extending retaining fingers, the fingers being of substantial width and curved transverse cross section to render the same substantially resilient but radially flexible under tension, the fingers extending initially substantially parallel to said wall and closely adjacent thereto and having short and stiff obliquely divergent retaining terminal flanges, said terminal flanges being substantially shorter than the radial depth of said wheel openings and engaging edgewise against the opposing surface of said wall and resiliently deflecting the fingers into angular relation to the plane of the surface of the opening wall engaged by the finger terminals.

11. In a wheel structure including a tire rim and a wheel body secured to the tire rim and having wheel openings adjacent to the tire rim defined by inset reenforcing flange portions, a cover for the outer side of the wheel including wheel body and tire rim covering portions and an intermediate portion having apertures therein generally registering with the wheel openings, each of said apertures being defined at its radially inner side by an axially inwardly extending retaining finger lying close to the inset wheel opening flange with which associated and having a short and stiff divergent generally radially inwardly and axially outwardly extending retaining terminal flange engaging in gripping retaining relation with said inset flange portion, the retaining fingers lying so close to the inset flange portions that the wheel openings are substantially unobstructed for air circulation therethrough and through the cover apertures.

12. In a wheel structure including a tire rim and a wheel body of the disk spider-type having openings therethrough of substantial radial extent and defined at one radial side thereof by a substantially axially extending flange portion, a cover for the outer side of the wheel having axially inwardly extending resilient retaining fingers including elongated resiliently radially deflectable body portions lying in assembly on the wheel body in closely adjacent relation to said flange portion and spaced from said flange portion substantially less than the radial extent of said openings, and short and stiff divergently extending gripping terminals substantially shorter than the radial extent of said openings and engageable in direct edgewise gripping, snap-on, pry-off relation with the opposed face of said wheel opening flange portions intermediate the length of said flange portions, the body portions of the fingers being deflected radially and placed under resilient tension driving the tips of said retaining terminals against said opposing faces of the flange portions.

13. In a vehicle wheel structure including tire rim and body parts with air circulation openings through the wheel, a circular wheel trim for disposition over the outer side of the wheel comprising a circular sheet metal body having a portion provided with an annular series of openings therethrough for air circulation therethrough and through said wheel openings, material derived from said openings and connected in one piece with said cover portion directed generally axially inwardly behind the cover and providing retaining finger body legs of substantial length and resilient resistance to radial deflection, said finger body legs facing generally radially for opposed generally telescoped disposition in radially deflectable relation to an opposing radially facing substantially straight and generally axially extending wheel flange, said finger body legs having short and stiff terminals directed generally axially outwardly and radially obliquely relative to said finger body legs and engageable in self-retaining relation directly edgewise against said wheel flange, the retaining edges of the terminals being radially deflectable from a differential diameter relative to said wheel flange by resilient yielding of the finger body legs rather than said terminals, the junctures of the finger body legs with the cover portion having reinforcing means of substantial stiffness and acting to enhance the resilient resistance to radial deflection of the finger bodies in engagement with said cover flange, the cover being adapted to be pried free from the wheel by application of pry-off force in response to which the finger body legs yield resiliently and the edges of the terminals slide axially outwardly free from the wheel flange.

14. The structure of claim 13 wherein said juncture reinforcing means comprises an angular substantially rigid juncture rib formed on an arc corresponding to the circular periphery of the cover.

15. The structure of claim 13 wherein said juncture reinforcing means comprises pressed in generally axially extending reinforcing flange structure defining the edges of the openings alongside the finger body legs and integrally joined to the sides of the finger body legs in reinforcing relation.

16. The structure of claim 13 wherein said juncture reinforcing means comprises a rigid juncture rib formed on an arc corresponding to the periphery of the cover for each of the fingers and in addition generally axially inwardly directed reinforcing flanges defining the edges of the wheel cover openings and merging reinforcingly into the sides of the respective finger body legs.

References Cited in the file of this patent

UNITED STATES PATENTS

| | | |
|---|---|---|
| 1,958,484 | Lyon | May 15, 1934 |
| 2,231,931 | Lyon | Feb. 18, 1941 |
| 2,312,568 | Lyon | Mar. 2, 1943 |
| 2,368,228 | Lyon | Jan. 30, 1945 |
| 2,368,238 | Lyon | Jan. 30, 1945 |
| 2,406,390 | Lyon | Aug. 27, 1946 |
| 2,682,937 | Lyon | July 6, 1954 |
| 2,757,986 | Lyon | Aug. 7, 1956 |